United States Patent [19]

Harju et al.

[11] Patent Number: 4,971,701

[45] Date of Patent: Nov. 20, 1990

[54] WHEY-BASED MIXTURE USEFUL IN FOOD PREPARATION

[75] Inventors: Matti Harju, Nummela; Matti Heikonen, Espoo, both of Finland

[73] Assignee: Alio Meijerien Keskusosuusliike, Helsinki, Finland

[21] Appl. No.: 363,552

[22] Filed: Jun. 9, 1989

Related U.S. Application Data

[63] Continuation-in-part of Ser. No. 266,677, Nov. 3, 1988, Pat. No. 4,855,056.

[30] Foreign Application Priority Data

Nov. 6, 1987 [FI] Finland .................................. 874925

[51] Int. Cl.⁵ ............................................ E01D 61/42
[52] U.S. Cl. ..................................... 210/638; 210/639; 210/641; 210/644; 210/651
[58] Field of Search ................ 210/634, 638, 639, 641, 210/644, 645, 649, 650, 651, 652, 500.37; 204/182.4; 426/583

[56] References Cited

U.S. PATENT DOCUMENTS

| | | | |
|---|---|---|---|
| 4,012,324 | 3/1977 | Gregor | 310/500.37 |
| 4,331,525 | 5/1982 | Huba et al. | 204/182.4 |
| 4,554,076 | 11/1985 | Speaker | 210/639 |
| 4,855,056 | 8/1989 | Harju et al. | 210/638 |

Primary Examiner—Frank Sever
Attorney, Agent, or Firm—Cushman, Darby & Cushman

[57] ABSTRACT

A process for removing at least a portion of salts contained in whey or a liquid based on whey by means of electrolysis while producing an acid mixture and a base mixture useful in food industries. In the process a four-compartment electrolytic cell is used in the electrolysis of the whey or the liquid based on whey. The four compartments between an anode and a cathode are separated from each other by means of ion exchange membranes and an independent liquid recirculation is connected with each one of the four compartments of the electrolytic cell. A three-compartment cell is disclosed, in which anodes and cathodes, except at the ends of the stack, are replaced by bipolar membranes. The modified cell is similarly used on cheese whey concentrate, to produce an acid solution and a base solution.

6 Claims, 2 Drawing Sheets

WHEY-BASED MIXTURE USEFUL IN FOOD PREPARATION

This is a continuation-in-part of application No. 07/266,677, filed Nov. 3, 1988, now U.S. Pat. No. 4,855,056, issued Aug. 8, 1989.

BACKGROUND OF THE INVENTION

The invention relates to a process for removing by electrolysis at least a portion of salts contained in whey or a liquid based on whey while producing an acid mixture and a base mixture useful in food industries. The invention is further concerned with products obtained by means of the process, particularly with an acid mixture and a base mixture useful in food industries.

The high salt content of whey obtained as a side product in the production of cheese and casein is the main reason why whey cannot be used in foodstuffs. However, demineralized whey powder has many uses in baby foods, ice-cream and bakery industries. Demineralization of whey has long been carried out by electrodialysis and ion exchange. Such techniques have also been combined for improving the efficiency and economy of the demineralization process (see e.g. British Patent Specification No. 1,583,814). It is typical of all the techniques mentioned above that the salts contained in whey as well as small amounts of the other whey solids, i.e. lactose and proteins, get into the waste water. Waste water treatment increases considerably the cost of the demineralization process and may even prevent the introduction of the process. Since waste water regulations are becoming increasingly strict, attempts have been made to solve this problem. Recently, a new demineralization process based on ion exchange has been developed in which part of the regeneration chemicals can be reused (see e.g. U.S. Patent Specification No. 4,159,350). However, this process, too, produces considerable amounts of waste water, so there is still a need of new techniques by means of which waste water problems are avoided or at least substantially reduced.

On the other hand, it has long been known that a salt solution can be rendered to a corresponding acid and base in an electrolytic cell divided into four compartments by means of cation and anion exchange membranes (see e.g. French Patent Specification No. 1,324,549). This technique, however, has been applied only to the treatment of pure inorganic and organic salts. Electrolysis as such has also been used experimentally in the treatment of milk (see e.g. British Patent Specification No. 2,100,289 A); however, the cell structure described in the examples has thereby comprised two or three compartments and the aim has not been to demineralize milk but to adjust its pH.

SUMMARY OF THE INVENTION

It has now been unexpectedly discovered that problems caused by salt-containing waste waters formed in the demineralization of whey, such as cheese whey or acid whey, or a liquid based on whey, such as permeate or mother liquor from the production of lactose, are avoided when the demineralization is carried out by means of a four-compartment electrolytic cell. At the same time the anions and cations of salts contained in the whey or the liquid based on whey are recovered. The anions are recovered in an acid circulation solution which is thus composed of an acid mixture. Correspondingly, the cations are recovered in a base circulation solution which is thus composed of a base mixture. Said circulation solutions can be used as acids and bases in the food industries, for instance. In this way it is e.g. possible to produce acid and base from whey while it is demineralized.

As an electrolytic raw material, whey is in many respects more problematic than a pure salt solution. Whey contains proteins which precipitate easily especially close to their isoelectric point (pH 4 to 5). In addition, cheese whey always contains so called "cheese dust", i.e., finely divided casein precipitate. Whey further contains residual fat and relatively plenty of calcium which precipitates easily at a high pH in particular. When demineralizing whey in an electrodialysis apparatus, for instance, it is necessary to continuously add hydrochloric acid to the salt solution side so as to prevent calcium precipitation. Therefore it is highly surprising that no precipitation problems could be observed in the whey electrolysis tests and that the demineralizing efficiency was not substantially dependent on the pH of the whey, as appears from the examples set forth below.

The process according to the invention, in which at least a portion of salts contained a liquid selected from whey and liquids based on whey is removed by electrolysis while producing an acid mixture and a base mixture useful in food industries, comprises using a four-compartment electrolytic cell in the electrolysis of the liquid selected from whey and liquids based on whey, the electrolytic cell comprising in succession (a) an anolyte compartment defined by an anode plate and a first cation exchange membrane, (b) an acid compartment defined by the first cation exchange membrane and an anion exchange membrane, (c) a whey compartment defined by the anion exchange membrane and a second cation exchange membrane and intended for the liquid to be treated which is selected from whey and liquids based on whey, and (d) a base compartment defined by the second cation exchange membrane and a cathode plate, independent liquid recirculations being connected to each one of the four compartments of the electrolytic cell; whereby the starting solution used in the liquid recirculation connected with the whey compartment is a liquid selected from cheese whey, acid whey, permeate and a mother liquor from the production of lactose, each as such, and from cheese whey, acid whey, permeate and a mother liquor from the production of lactose, each as concentrated to a dry matter content of no more than 40% by weight; the starting solution used in the acid recirculation connected with the acid compartment is a liquid selected from acid solutions having an anion composition corresponding to that of the liquid to be treated which is selected from whey and liquids based on whey, and lactic acid; the starting solution used in the base recirculation connected with the base compartment is a liquid selected from base solutions having a cation composition corresponding to that of the liquid to be treated which is selected from whey and liquids based on whey, and sodium hydroxide; and the starting solution used in the anolyte recirculation connected with the anolyte compartment is an aqueous solution of an acid.

DETAILED DESCRIPTION

Figure 1:
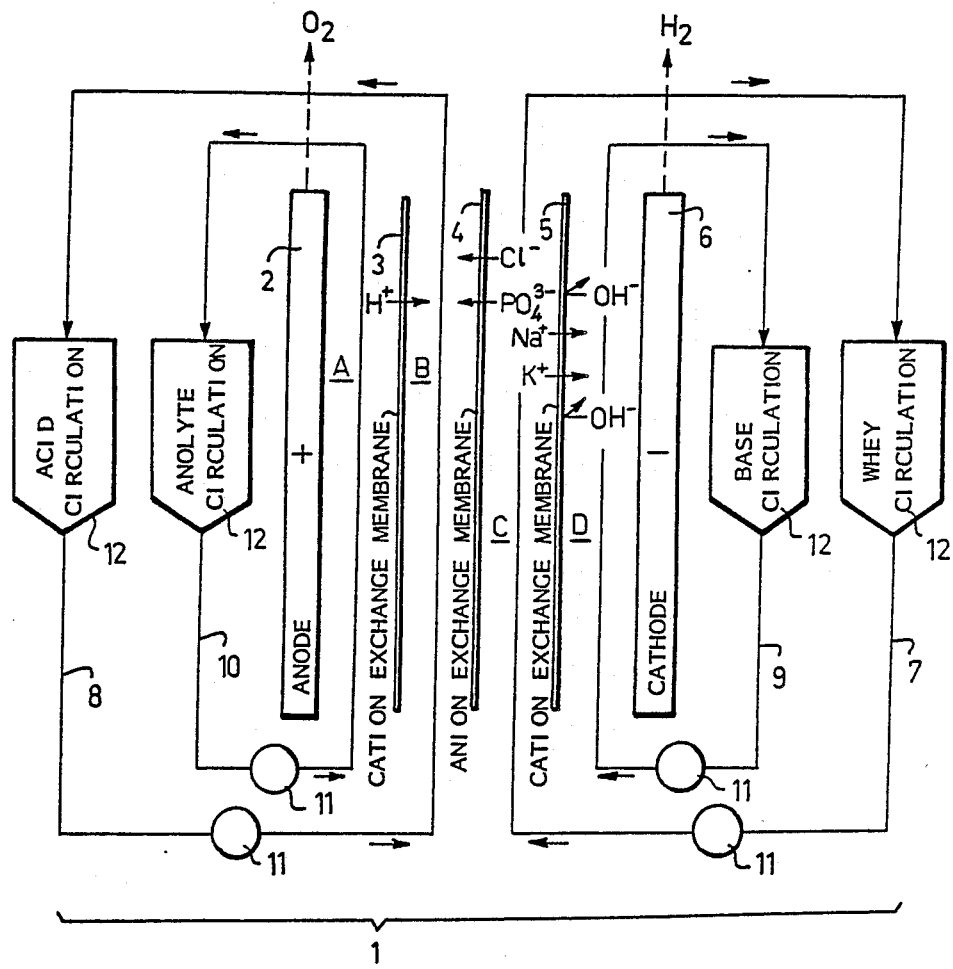
FIG. 1 shows a schematic view of the use of a four-compartment electrolytic cell according to the invention in the demineralization of whey and simultaneous production of acid and base.

In FIG. 1, the electrolytic cell 1 comprises in succession an anolyte compartment A defined by an anode plate 2 and a first cation exchange membrane 3, an acid compartment B defined by the first cation exchange membrane and an anion exchange membrane 4, a whey compartment C defined by the anion exchange membrane and a second cation exchange membrane 5 and intended for the whey or the liquid based on whey which is to be treated, and a base compartment D defined by the second cation exchange membrane and a cathode plate 6.

The anode can be formed by conventional plate electrodes used in electrolytic cells, such as a platinated titan electrode. The cathode can correspondingly be formed by conventional plate electrodes used in electrolytic cells, e.g. of stainless steel.

The following net reactions occur at the anode and the cathode:

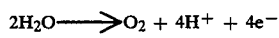

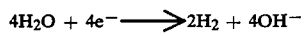

The ion exchange membranes can be conventional ion-selective semi-permeable cation exchange membranes and anion exchange membranes used in electrodialysis. In the cell the ion exchange membranes and the electrode plates are assembled into a stack in which the ion exchange membranes are separated from each other and/or from the electrode plates by means of conventional spacers. Individual cells can be connected in series and/or in parallel.

A liquid recirculation 7 is connected with the whey conpartment C, an acid recirculation 8 is connected with the acid compartment B, a base recirculation 9 is connected with the base compartment D, and an anolyte recirculation 10 is connected with the anolyte compartment B.

The independent liquid recirculations connected with the different compartments of the cell are provided with separate pumps 11, containers 12 and outlets. The recirculations, particularly the acid, base and anolyte recirculations, can be connected with the respective recirculations of other cells.

The process according to the invention can be carried out in a batchwise manner, whereby the demineralized liquid and the resultant acid and base solutions are recovered. The process can also be carried out continuously, whereby the recirculation of the liquid to be demineralized can be continuously supplied with fresh liquid while demineralized liquid is being removed from the circulation. The acid and base recirculations can be correspondingly made continuous.

When several cells are used the recirculations can be connected with the respective recirculations of another cell or other cells.

In the anolyte recirculation connected with the anolyte compartment, the starting solution is an aqueous solution of an acid, preferably an aqueous solution of a 0.5 to 3% by weight acid. The most suitable anolyte solution is an aqueous solution of 1% sulphuric acid.

In the acid recirculation connected with the acid compartment, the starting solution is an acid solution having an anion composition corresponding to that of the liquid to be treated which is selected from whey and liquids based on whey, or lactic acid. Preferably, said acid solution is used as a starting liquid in the acid recirculation means.

When an acid solution has an anion composition corresponding to that of whey, its anion composition resembles that of whey and preferably is similar to that of whey.

In the base recirculation connected with the base compartment, the starting solution is a base solution with a cation composition corresponding to that of the liquid to be treated which is selected from whey and liquids based on whey, or sodium hydroxide. Preferably, said base solution is used as a starting solution in the base recirculation.

When a base solution has a cation composition corresponding to that of whey, its cation composition resembles that of whey and preferably is similar to that of whey.

In the liquid recirculation connected with the whey compartment, the starting solution is e.g. cheese whey, acid whey, permeate obtained from the ultrafiltration of whey, or mother liquor from the production of lactose as such or concentrated to a dry matter content of no more than 40% by weight.

A suitable process temperature is 0° to 60° C., preferably 20° to 50° C.

The process according to the invention is particularly suitable for use in the demineralization of whey. The composition of typical cheese whey is shown in the following Table 1; the composition of acid whey is nearly similar to that of cheese whey.

TABLE 1

| Composition of typical cheese whey | |
|---|---|
| Dry content | 6.0% by weight |
| Lactose | 4.5% by weight |
| Protein | 0.7% by weight |
| Fat | 0.1% by weight |
| Ash | 0.5% by weight |
| Calcium | 350 mg/l |
| Magnesium | 90 mg/l |
| Sodium | 450 mg/l |
| Potassium | 1400 mg/l |
| Phosphor | 450 mg/l |
| Chloride | 1000 mg/l |
| Lactic acid | 900 mg/l |
| Citric acid | 1400 mg/l |

The cation and anion composition of whey appears from Table 1.

In the electrolytic cell shown in FIG. 1, the cations contained in the whey recirculation, such as $K^+$ and $Na^+$ ions, migrate through the cation exchange membrane into the base recirculation, where they form hydroxides with $OH^-$ ions formed at the cathode, so that the base recirculation is concentrated and the amount of hydroxides corresponding to these particular ions is increased in the base recirculation. If an aqueous solution of sodium hydroxide is used as a starting solution in the base recirculation, it is converted to a mixture of the aqueous solutions of potassium, sodium, calcium och magnesium hydroxides during the process. At the same time anions contained in the whey recirculation, such as $Cl^-$ and $PO_4^{3-}$ ions, migrate through the anion exchange membrane into the acid recirculation, where they form corresponding acids with $H^+$ ions migrated into the acid recirculation from the anolyte recirculation through the cation exchange membrane, so that the acid recirculation is concentrated. If an aqueous solution of lactic acid is used as a starting solution in the acid recirculation, it is converted into a mixture of the aqueous solutions of citric acid, lactic acid, hydrochloric acid and phosphoric acid during the process.

Being physically separated from a foodstuff, the base and acid mixtures forming the base recirculation and the acid recirculation can obviously be regarded as suitable for use in foodstuffs as such. Said acid and base mixtures could thus be used e.g. in washings and pH adjustments at the same plant or they could be sold to other food manufacturers after concentration, if necessary.

Demineralized liquid, such as whey, is recovered as such or is concentrated and dried into a powder for further use.

Whey is preferably concentrated before electrolysis for improving conductivity and the demineralizing efficiency dependent thereon.

The process according to the invention can also be used in the treatment of liquids based on whey and having the same salt composition as whey. Such liquids include the ultrafiltration permeate of whey and the mother liquor formed in the production of lactose.

Whey proteins are recovered in the ultrafiltration of whey while permeate is obtained as a side product containing the ingredients which have passed through the ultrafiltration membrane, i.e., lactose, whey salts and low-molecular nitrogen compounds. In the lactose manufacture, lactose is removed from whey by crystallization, thus obtaining a mother liquor containing the whey salts, for instance. These possibilities are also described in the examples, where the percentages are percentages by weight.

EXAMPLE 1

The tests were carried out with a Stackpack electrolysis apparatus of Ionics Inc., comprising 18 four-part electrolytic cells. The effective membrane area of each cell was 232 $cm^2$, the effective membrane area of the whole stack being 0.42 $m^2$. The tests were carried out in a batchwise manner so that the whey, acid and base compartments formed separate recirculations with their pumps and containers; in addition, the anolyte compartment comprised separate recirculation in which 1% sulphuric acid was circulated. 3% lactic acid was used as a starting solution in the acid recirculation and 3% sodium hydroxide in the base recirculation. 20% cheese whey concentrate having a pH of 5.3 was used as a raw material. Table 2 shows the parameters of the test and Table 3 the results obtained from the test.

TABLE 2

Parameters in the demineralization of cheese whey concentrate (pH 5.3) when using electrolysis

| Time (min) | Temperature (°C.) | Current/cell (A) | Voltage/cell (V) | Current density (A/$m^2$) | Flow (l/min) whey | acid | base | anolyte |
|---|---|---|---|---|---|---|---|---|
| 0 | 24 | 4.2 | 5.7 | 180 | 1.6 | 2.5 | 5.3 | 5.3 |
| 10 | 28 | 3.7 | 5.8 | 160 | 0.7 | 1.3 | 3.1 | 3.0 |
| 20 | 31 | 3.4 | 6.0 | 150 | 0.8 | 1.3 | 3.3 | 3.1 |
| 30 | 34 | 3.0 | 6.2 | 130 | 0.8 | 1.4 | 3.3 | 3.1 |
| 40 | 36 | 2.5 | 6.3 | 110 | 0.9 | 1.4 | 3.4 | 3.2 |
| 50 | 38 | 1.8 | 6.5 | 80 | 1.0 | 1.4 | 3.5 | 3.3 |

TABLE 3

Results from the demineralization of cheese whey concentrate (pH 5.3) when using electrolysis

| | Time (min) | | | | | |
|---|---|---|---|---|---|---|
| | 0 | 10 | 20 | 30 | 40 | 50 |
| Whey recirculation | | | | | | |
| Dry matter (°Brix) | 19.0 | 18.5 | 18.2 | 18.1 | 17.9 | 17.6 |
| Conductivity (mS/cm) | 9.5 | 4.3 | 3.0 | 2.0 | 1.2 | 0.7 |
| Phosphor, soluble (mg/kg) | 830 | 550 | 390 | 280 | 200 | 140 |
| Chloride (g/kg) | 3.7 | 1.1 | 0.65 | 0.35 | 0.18 | 0.10 |
| pH | 5.3 | 5.2 | 5.0 | 4.8 | 4.6 | 4.3 |
| Ash (%) | 1.5 | | | | | 0.24 |
| Calcium (mg/kg) | 1100 | | | | | 290 |
| Magnesium (mg/kg) | 230 | | | | | 74 |
| Sodium (mg/kg) | 1600 | | | | | 320 |
| Potassium (mg/kg) | 4400 | | | | | 430 |
| Protein (%) | 2.5 | | | | | 2.6 |
| Lactose (%) | 13.7 | | | | | 13.8 |
| Solution volume (l) | 7.3 | | | | | 6.7 |
| Acid recirculation | | | | | | |
| Titratable acidity (% lactic acid) | 2.2 | 2.8 | 3.1 | 3.3 | 3.4 | 3.5 |
| Conductivity (mS/cm) | 3.3 | 22 | 28 | 31 | 33 | 34 |
| pH | 2.2 | 1.4 | 1.3 | 1.2 | 1.2 | 1.2 |
| Phosphor, soluble (mg/kg) | 10 | 150 | 260 | 380 | 470 | 540 |
| Chloride (g/kg) | 0.12 | 2.2 | 2.9 | 3.2 | 3.3 | 3.3 |
| Solution volume (l) | 6.1 | | | | | 8.1 |
| Base recirculation | | | | | | |
| Titratable acidity | 2.4 | 2.6 | 2.7 | 2.9 | 3.1 | 3.2 |

TABLE 3-continued

Results from the demineralization of cheese whey concentrate (pH 5.3) when using electrolysis

| | Time (min) | | | | | |
|---|---|---|---|---|---|---|
| | 0 | 10 | 20 | 30 | 40 | 50 |
| (% sodium hydroxide) | | | | | | |
| Conductivity (mS/cm) | 74 | 78 | 83 | 88 | 90 | 93 |
| Solution volume (l) | 4.6 | | | | | 4.6 |

The current density was adjusted at the beginning of the run to 4.2 A/cell and it was not adjusted during the run. The apparatus did not comprise temperature adjusting means, wherefore the temperature of the solutions rose during the run. As appears from Table 3, the whey salts are removed similarly as in conventional demineralization techniques, simultaneously obtaining acid and base. Lactose and protein do not migrate through the membranes to any greater extent.

EXAMPLE 2

Example 1 was repeated except that the pH of the whey concentrate was adjusted for run (a) prior to the run to 6.3 and for run (b) prior to the run to 4.3. These changes did not substantially affect the results.

EXAMPLE 3

Concentrated acid whey obtained from the production of casein was used as raw material. Table 4 shows the parameters and Table 5 the analysis results. With the exception of the raw material, the conditions were the same as in Example 1.

TABLE 4

Parameters in the demineralization of an acid whey concentrate (pH 4.1) when using electrolysis

| Time (min) | Temperature (°C.) | Current/cell (A) | Voltage/cell (V) | Current density (A/m²) | Flow whey | acid (l/min) | base | anolyte |
|---|---|---|---|---|---|---|---|---|
| 0 | 27 | 4.2 | 5.3 | 180 | 1.6 | 2.5 | 5.4 | 5.4 |
| 10 | 32 | 4.0 | 5.5 | 170 | 0.7 | 1.3 | 3.0 | 3.0 |
| 20 | 35 | 3.4 | 5.5 | 150 | 0.8 | 1.4 | 3.0 | 3.0 |
| 30 | 37 | 2.7 | 6.0 | 120 | 0.9 | 1.4 | 3.1 | 3.0 |
| 40 | 39 | 1.8 | 6.3 | 80 | 1.0 | 1.4 | 3.0 | 3.1 |

TABLE 5

Results from the demineralization of acid whey concentrate (pH 4.1) when electrolysis was used

| | Time (min) | | | | |
|---|---|---|---|---|---|
| | 0 | 10 | 20 | 30 | 40 |
| Whey recirculation | | | | | |
| Dry matter (°Brix) | 15.8 | 14.9 | 14.6 | 14.1 | 13.9 |
| Conductivity (mS/cm) | 12.3 | 6.7 | 3.6 | 1.4 | 0.5 |
| Phosphor, soluble (mg/kg) | 1200 | 1090 | 870 | 550 | 200 |
| Chloride (g/kg) | 9.1 | 4.1 | 1.9 | 0.55 | 0.12 |
| pH | 4.1 | 4.1 | 4.0 | 4.2 | 4.3 |
| Solution | 3.2 | | | | 2.8 |
| volume (l) | | | | | |
| Acid recirculation | | | | | |
| Titratable acidity (% lactic acid) 2.2 | 3.0 | 3.5 | 3.7 | 3.9 | |
| Conductivity (mS/cm) | 2.2 | 20 | 28 | 34 | 35 |
| pH | 2.3 | 1.4 | 1.2 | 1.1 | 1.1 |
| Phosphor, soluble (mg/kg) | 9 | 43 | 100 | 220 | 390 |
| Chloride (g/kg) | 0.1 | 3.1 | 4.5 | 5.4 | 5.8 |
| Solution volume (l) | 5.5 | | | | 5.6 |
| Base recirculation | | | | | |
| Titratable alkalinity (% sodium hydroxide) | 2.5 | 2.7 | 2.8 | 2.9 | 3.0 |
| Conductivity (mS/cm) | 63 | 66 | 68 | 70 | 71 |
| Solution volume (l) | 4.1 | | | | 4.0 |

EXAMPLE 4

Example 3 was repeated except that the raw material used was concentrated acid whey. The pH of the concentrate, however, was adjusted to 6.1 before electrolysis. This change had no greater effect on the test results.

EXAMPLE 5

Concentrated permeate obtained from the ultrafiltration of whey was used as a raw material. Table 6 shows the parameters and Table 7 the test results. Otherwise the conditions were the same as in Example 1.

TABLE 6

Parameters in the demineralization of permeate concentrate when using electrolysis

| Time (min) | Temperature (°C.) | Current/cell (A) | Voltage/cell (V) | Current density (A/m²) | Flow whey | acid (l/min) | base | anolyte |
|---|---|---|---|---|---|---|---|---|
| 0 | 27 | 4.2 | 5.5 | 180 | 1.8 | 2.5 | 5.2 | 5.2 |
| 10 | 31 | 3.6 | 5.7 | 160 | 0.9 | 1.3 | 3.1 | 3.0 |
| 20 | 35 | 2.5 | 6.2 | 110 | 0.9 | 1.4 | 3.3 | 3.2 |

TABLE 6-continued

Parameters in the demineralization of permeate concentrate when using electrolysis

| Time (min) | Temperature (°C.) | Current/cell (A) | Voltage/cell (V) | Current density (A/m²) | Flow whey | Flow acid (l/min) | Flow base | anolyte |
|---|---|---|---|---|---|---|---|---|
| 30 | 36 | 1.5 | 6.5 | 60 | 1.0 | 1.4 | 3.5 | 3.3 |

TABLE 7

Results from the demineralization of a permeate concentrate when using electrolysis

| | Time (min) | | | |
|---|---|---|---|---|
| | 0 | 10 | 20 | 30 |
| Whey recirculation | | | | |
| Dry matter (°Brix) | 17.2 | 16.5 | 16.2 | 16.1 |
| Conductivity (mS/cm) | 9.1 | 3.0 | 1.0 | 0.3 |
| Phosphor, soluble (mg/kg) | 750 | 440 | 180 | 60 |
| Chloride (g/kg) | 3.5 | | | 0.1 |
| pH | 5.2 | 5.1 | 4.3 | 3.4 |
| Solution volume (l) | 3.8 | | | 3.6 |
| Acid recirculation | | | | |
| Titratable acidity (% lactic acid) | 2.2 | 2.8 | 3.1 | 3.2 |
| Conductivity (mS/cm) | 3.7 | 21 | 24 | 25 |
| pH | 2.1 | 1.5 | 1.4 | 1.3 |
| Solution volume (l) | 6.0 | | | 6.6 |
| Base recirculation | | | | |
| Titratable alkalinity (% sodium hydroxide) | 2.3 | 2.5 | 2.6 | 2.7 |
| Conductivity (mS/cm) | 75 | 81 | 84 | 87 |
| Solution volume (l) | 4.8 | | | 4.8 |

EXAMPLE 6

The demineralization test was carried out as described in Example 1 but the raw material used was unconcentrated whey (dry matter 6%). Table 8 shows the most important parameters and results.

TABLE 8

The most important parameters and results of the demineralization of unconcentrated cheese whey

| Time (min) | Temperature (°C.) | Current/cell (A) | Voltage/cell (V) | Current density (A/m²) | Whey conduct. (mS/cm) |
|---|---|---|---|---|---|
| 0 | 21 | 4.2 | 6.7 | 180 | 3.1 |
| 5 | 24 | 1.9 | 7.7 | 82 | 1.2 |
| 10 | 26 | 1.2 | 8.0 | 5.2 | 0.6 |

It appears from the table that unconcentrated whey, too, demineralizes well whereas a rapid decrease occurs in the current and current density due to the low conductivity. Therefore it is preferable to demineralize concentrated whey.

EXAMPLE 7

The demineralization test was carried out as described in Example 1 except that the raw material used was a mother liquor formed in the production of lactose and having a dry matter of about 20%. The following Table 9 shows the most important parameters and results.

TABLE 9

The most important parameters and results in the demineralization of a mother liquor formed in the production of lactose

| Time (min) | Temperature (°C.) | Current density (A/m²) | Conduct. of mother liquor (mS/cm) | Conduct. of acid solution (mS/cm) | Conduct. of base solution (mS/cm) |
|---|---|---|---|---|---|
| 0 | 24 | 180 | 17 | 2.8 | 79 |
| 10 | 29 | 180 | 9.5 | 25 | 84 |
| 20 | 32 | 170 | 6.7 | 35 | 90 |
| 30 | 35 | 150 | 4.3 | 40 | 95 |
| 40 | 36 | 110 | 2.8 | 42 | 98 |
| 50 | 39 | 86 | 1.8 | 43 | 100 |
| 60 | 41 | 68 | 1.2 | 43 | 102 |

It appears from the table that the process is also well suited for a mother liquor formed in the production of lactose.

EXAMPLE 8

The raw material used was the same cheese whey concentrate as in Example 1 and the run conditions were the same with the exception that the starting solution used in the acid recirculation was not 3% lactic acid but a 1% acid solution having an anion composition corresponding to that of whey. Correspondingly, the starting solution used in the base recirculation was not 3% sodium hydroxide but a 1% base solution having a cation composition corresponding to that of whey. The compositions of these solutions are given in Tables 10 and 11. The acid and base recirculation solution after the first run was used as a starting solution in the next run. The acid and base recirculation solutions after the second run were used as starting solutions in the third run. After the third run the compositions of the solutions were analyzed and they are shown in Tables 10 and 11.

TABLE 10

Composition of the acid solution before the first run and after the third run

| | Hydrochl. acid | Phosphoric acid | Lactic acid | Citric acid |
|---|---|---|---|---|
| Acid before run I | 0.25% | 0.25% | 0.25% | 0.25% |
| Acid after run III | 0.83% | 0.60% | 0.78% | 0.67% |

TABLE 11

Composition of the base solution before the first run and after the third run

| | KOH | NaOH | Ca(OH)₂ | Mg(OH)₂ |
|---|---|---|---|---|
| Base before run I | 0.65% | 0.22% | 0.11% | 0.02% |
| Base after run III | 2.1% | 0.68% | 0.25% | 0.04% |

EXAMPLE 9

The acid produced in Example 8 was concentrated by evaporating to a concentration of 30%. The solution was completely clear and slightly yellowish in colour. The pH of the whey drink was adjusted from 4.5 to 3.8 with said acid. Normally, the pH adjustment is carried out by means of citric acid. A test panel observed no difference when comparing a drink adjusted with said acid solution with a normal product.

EXAMPLE 10

The base produced in Example 8 was used for adjusting the pH of curd whey from 4.5 to 6.0 before drying. Normally, the pH is adjusted with sodium hydroxide. The drying of a curd whey neutralized with said base solution was as successful as that of a normal product and the powders had an equally good taste.

Currently, a new bipolar ion exchange membrane has been developed. It is basically made of one anion exchange and one cation exchange membrane. Inside the bipolar membrane, water is split to hydrogen ions ($H^+$) and hydroxyl ions ($OH^-$). In the electrolytic cell, the first cation exchange membrane 3 can be replaced by such a bipolar membrane. When an electrolysis apparatus comprising several electrolytic cells is used, electrodes 2 and 6 are needed only at the ends of a stack, but other anodes and cathodes can be replaced by such bipolar membranes.

Figure 2:
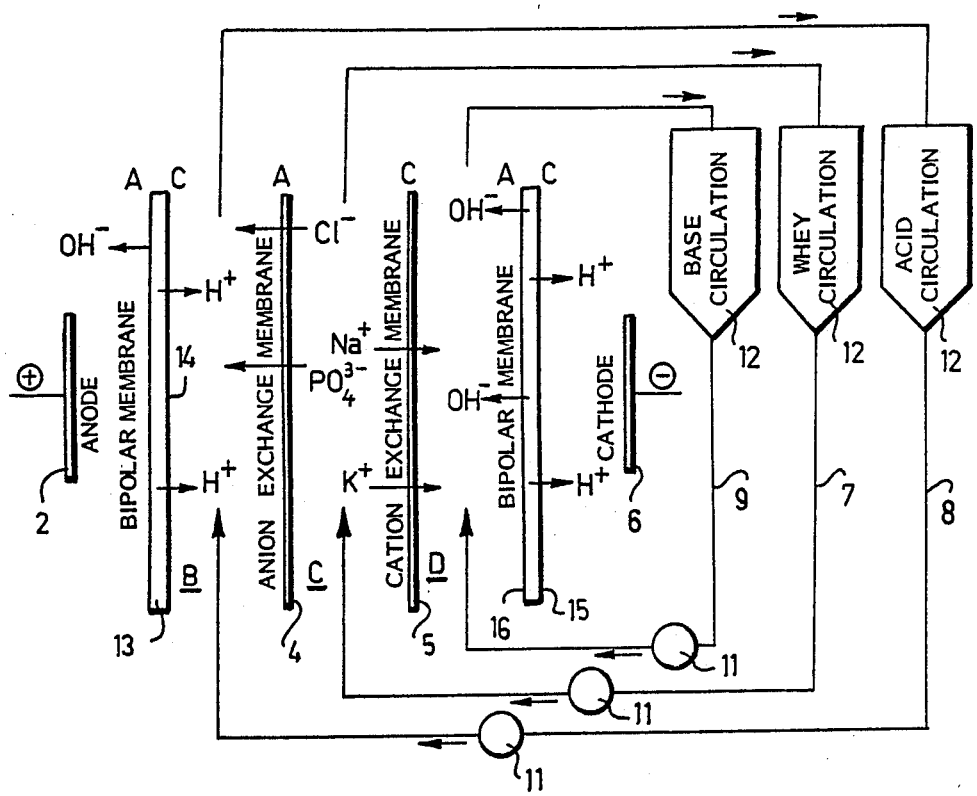
FIG. 2 shows a schematic view of the use of a three-compartment cell according to the invention, for demineralization of whey and simultaneous production of an acid and a base.

Referring to FIG. 2, when the anodes and cathodes in the electrolytic cell are replaced by bipolar membranes, the cell has only three compartments (anolyte circulation 10 and the cation exchange membrane 3 are eliminated) and the anode 2 and cathode 6 are needed only at the ends of a stack. The stack may contain hundreds of three-compartment cells separated by bipolar membranes. A three-compartment cell comprises the cationic side 14 of a first bipolar membrane 13, acid compartment 3, anion exchange membrane 4, whey compartment C, cation exchange membrane 5, base compartment D and the anionic side 16 of the next bipolar membrane 15.

EXAMPLE 11

A test identical to Example 8 was repeated using the cell of FIG. 2 having bipolar membranes instead of electrodes. The change did not affect the composition of the acid and base mixtures.

We claim:
1. A method for electrolytically demineralizing a liquid, whey-based material selected from the group consisting of cheese whey, acid whey, permeate obtained from ultrafiltration of whey (containing lactose, whey salts and low molecular weight nitrogen compounds), and mother liquor from production of lactose (containing whey salts), and having a dry solids concentration of up to 40 percent by weight,
said method comprising:
(a) providing a whey circulation path, an acid circulation path and a base circulation path each having an upstream site for accepting an input and a downstream site for recovering an output;
(b) providing an operative electrolytic cell including, in a stacked relation, an anode, at least three ion exchange membranes, and a cathode whereby at least three paths are defined through said cell all separated from one another by intervening ones of said ion exchange membranes, these paths being so arranged that a second, intermediate one is separated from a flanking first one and a flanking third one respectively by an anion one of said ion exchange membranes, disposed closer to said anode, and a cation one of said exchange membranes, disposed closer to said cathode; an intermediate segment of said acid circulation path passing between said anode and said anion exchange membrane member along a first one of said three paths; and intermediate segment of said base circulation path passing between said cathode and said cation exchange membrane along a third one of said three paths; and an intermediate segment of said whey circulation path passing between said anion exchange membrane and said cation exchange membrane along a second one of said three paths;
(c) while operating said electrolytic cell,
(i) introducing a quantity of said liquid, whey-based material into said whey circulation path at the respective said upstream input accepting site;
(ii) introducing a quantity of an acid solution selected from the group consisting of an acidic aqueous solution having an anion composition corresponding to that of said liquid, whey-based material, and lactic acid, into said acid circulation path at the respective said upstream input accepting site;
(iii) introducing a quantity of a base solution selected from the group consisting of a basic aqueous solution having a cation composition corresponding to that of said liquid, and sodium hydroxide into said base circulation path at the respective side upstream input accepting site; and
(d) as a consequence of conducting step (c),
(i) recovering at said downstream recovering site of said whey circulation path a demineralized liquid, whey-based material;
(ii) recovering at said downstream recovering site of said acid circulation path an acid mixture which is enriched in anions present in said liquid, whey-based material, compared with presence thereof in said acid solution,
(iii) recovering at said downstream recovering site of said base circulation path a basic mixture which is enriched in cations present in said liquid, whey-based material, compared with presence thereof in said base solution.
2. The method of claim 1, wherein:
step (a) further includes providing an anolyte circulation path having an upstream site for accepting an input and a downstream site for recovering an output;
step (b) further includes providing in said operative electrolytic cell a fourth path between said anode and a respective one of said ion exchange membranes adjacent said flanking first one of said three paths;
step (c) further includes:
(iv) introducing a quantity of an aqueous solution of an acid into said basic circulation path at the respective said upstream input accepting site.
3. The method of claim 2, wherein:
said aqueous solution of acid introduced in substep (iv) of step (c) is an aqueous solution containing from 0.5 percent to 3.0 percent by weight sulfuric acid.
4. An acid mixture produced by the process of claim 1.
5. A base mixture produced by the process of claim 1.
6. A demineralized liquid, whey-based material produced by the process of claim 1.

* * * * *

UNITED STATES PATENT AND TRADEMARK OFFICE
CERTIFICATE OF CORRECTION

PATENT NO. : 4,971,701
DATED : November 20, 1990
INVENTOR(S) : Harju, Matti et al It is certified that error appears in the above-identified patent and that said Letters Patent is hereby corrected as shown below:

ON TITLE PAGE:

Please Change:

"(73) Assignee: Alio Meijerien Keskusosuusliike, Helsinki, Finland to

--(73) Assignee: Valio Meijerien Keskusosuusliike, Helsinki, Finland

Signed and Sealed this

Twenty-eighth Day of April, 1992

Attest:

HARRY F. MANBECK, JR.

Attesting Officer

Commissioner of Patents and Trademarks